United States Patent [19]

Penn

[11] Patent Number: 4,535,401
[45] Date of Patent: Aug. 13, 1985

[54] APPARATUS AND METHOD FOR PROVIDING POWER FROM MASTER CONTROLLER TO SUBCONTROLLERS AND DATA COMMUNICATION THEREBETWEEN

[75] Inventor: Thomas C. Penn, Richardson, Tex.

[73] Assignee: Texas Instruments Incorporated, Dallas, Tex.

[21] Appl. No.: 394,033

[22] Filed: Jun. 30, 1982

[51] Int. Cl.³ .............................................. G06F 15/46
[52] U.S. Cl. ..................... 364/132; 364/138; 364/139; 340/825.06; 340/825.54; 340/505; 340/310 R
[58] Field of Search ............. 364/132, 138, 139; 340/825.06, 825.54, 505, 310 R

[56] References Cited

U.S. PATENT DOCUMENTS

| | | | |
|---|---|---|---|
| 3,582,621 | 6/1971 | Lawler | 364/138 |
| 3,944,928 | 3/1976 | Augenblick et al. | 325/65 |
| 4,035,772 | 7/1977 | Abe et al. | 340/825.06 |
| 4,077,030 | 2/1978 | Helava | 340/183 |
| 4,093,946 | 6/1978 | Fowler | 340/505 |
| 4,131,882 | 12/1978 | Hollabaugh et al. | 340/825.06 |
| 4,132,981 | 1/1979 | White | 340/203 |
| 4,139,737 | 2/1979 | Shimada et al. | 179/15 AL |
| 4,206,449 | 6/1980 | Golvin et al. | 340/505 |
| 4,208,653 | 6/1980 | Abe | 340/151 |
| 4,222,035 | 9/1980 | Lohoff | 340/167 R |
| 4,228,422 | 10/1980 | Perry | 340/310 R |
| 4,304,001 | 12/1981 | Cope | 364/132 |
| 4,316,262 | 2/1982 | Mizuta et al. | 364/900 |
| 4,408,185 | 10/1983 | Rasmussen | 340/825.54 |
| 4,408,291 | 10/1983 | Gunzberg et al. | 364/132 |
| 4,413,250 | 11/1983 | Porter et al. | 340/825.54 |
| 4,422,073 | 12/1983 | Winner | 340/870.21 |

*Primary Examiner*—Jerry Smith
*Assistant Examiner*—John R. Lastova
*Attorney, Agent, or Firm*—William E. Hiller; James T. Comfort; Melvin Sharp

[57] ABSTRACT

An apparatus having a two wire system for providing both power and data communication between a master controller and at least one subcontroller. The master controller can also be connected through the conductors to submaster controllers which in turn have subcontrollers connected thereto. The master controller is capable of addressing each of the submaster controllers and subcontrollers individually. A three voltage level system can be utilized to provide both power and addressing through the two conductors. Data transmitted by the subcontrollers can be analog and/or digital. A data entry device and an information display device can be connected to the master controller in the same manner as other subcontrollers.

12 Claims, 13 Drawing Figures

APPARATUS AND METHOD FOR PROVIDING POWER FROM MASTER CONTROLLER TO SUBCONTROLLERS AND DATA COMMUNICATION THEREBETWEEN

BACKGROUND OF THE INVENTION

1. Field of the Invention

This invention relates to communication systems, and more particularly, this invention relates to communication systems which provide both power and data through two conductors.

2. Description of the Prior Art

Various communication systems are known in the prior art. Some of the systems are utilized to connect computers together over a coaxial cable. An example of this type of system is the Ethernet system by the Xerox Corporation. This system utilizes a chain of repeaters to provide connections between long lengths of coaxial cable. The various systems utilized are polling of the various computers by a particular computer by an addressing system to determine if each computer has information to send. This technique is generally known as the aloha system. Another system is to provide a specific time interval based on a common system clock during which each of the computers can transmit. Various other systems, are known, for example, a computer generates a particular code onto the common network when it is ready to transmit. If the network is clear, the computer then commences to transmit. However, various interferences can and do occur in such systems. All of these systems require a high level of overhead and are generally not suitable for a low cost home environment.

None of the prior construction shows a two wire system which provides both power and data through the two conductors from a master controller to at least one subcontroller.

SUMMARY OF THE INVENTION

A communication system has a master controller which is coupled to a pair of electrical conductors. The master controller selectively applies both power and addressing information through the conductors to a subcontroller which is also connected to the two conductors. The master controller is also capable of receiving information from the subcontroller through the conductors. The master controller applies power pulses to the conductors and receives information from the subcontrollers during intervals between power pulses. These power pulses can provide the necessary timing (synchronization) and/or addressing to the subcontrollers. The master controller produces pulses in a known sequence. The subcontrollers store energy from the power pulses and are capable of selectively transmitting information which can include operational parameters, for example, status of sensor, fault indications, etc. on the conductors between the power pulses. The information transferred by the subcontrollers can be in the form of analog or digital signals. The master controller can provide three voltage levels for transmitting its addressing and timing signals on the two conductors. For example, the three voltages can be preselected positive and negative voltage levels and ground. The information transferred by the subcontrollers can include both status and data information. The master controller can provide various test signals to the subcontroller for determining if the subcontroller is functioning normally. A keyboard or manual input device can be provided for the manual entry of information and a display can be provided for displaying the information in human readable form located at any location on these two wires.

The communication system can also be provided with at least one submaster controller which is capable of allowing addressing by the master controller directly to each subcontroller connected through two additional conductors to the submaster controller. The submaster controller is also connected to the two conductors which are connected to the master controller.

It is an advantage of the present invention to provide a communication system between a master controller and a subcontroller which utilizes only two conductors for transferring both power and information.

Another advantage of the present invention is to provide a communication system having three voltage levels which are utilized to provide both power and addressing on two conductors.

Another advantage of the present invention is to provide a communication system which can test subcontrollers from a master controller by utilizing two conductors which provide both power and information to the subcontroller.

It is a further advantage of the present invention to provide a subcontroller which transfers information through two conductors to a master controller in analog form and receives power and addressing information from the master controller over the two conductors.

Another advantage of the present invention is to provide a communication system over two conductors which has a human readable display and a keyboard for manual entry of information thereinto, which has a master controller and/or subcontroller connected to the display and keyboard for displaying information and receiving information from the keyboard, and which has the master controller connected to the two conductors to provide both power and addressing to the subcontrollers also connected to the two conductors.

DESCRIPTION OF THE PREFERRED EMBODIMENT

Figure 1:
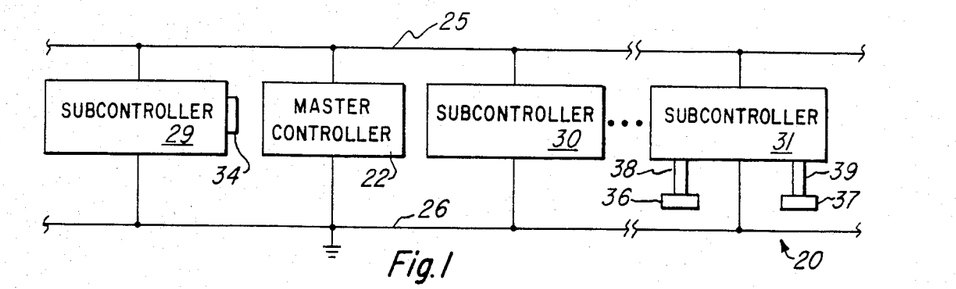
FIG. 1 is a block diagram of a communication system constructed according to the present invention.

With reference to the figures and in particular to FIG. 1 thereof, a communication system 20 has a master controller 22 connected to two conductors 25 and 26. Subcontrollers 29–31 are also connected to connectors 25 and 26. Conductor 25 can be, for example a lead or wire and conductor 26 can be, for example the body of an automobile, or aircraft, or an ordinary wire. Each conductor can be multiple paths which would still provide the necessary connects even if a break in a particular section of a path occurred. A sensor 34 is connected to subcontroller 29 and can be, for example, an over-temperature detector on a water heater, a gas leak detector, an optical smoke detector, an ionization smoke detector, etc. Sensors 36 and 37 are connected to subcontroller 31 through multiline channels 38 and 39, respectively. Sensors 36 and 37 can be, for example, sensors for determining whether or not windows are open or closed, such as magnetic switch detectors, shock detectors, or IR beam detectors utilized within a security control system. Generally, the sensors can be of any type known for determining engine temperature, RPM, air pressure, etc. within an automobile, aircraft, or other vehicle. Any type of suitable sensor can be utilized with the present invention. Although three subcontrollers are shown in FIG. 1, any number necessary can be utilized with the present invention.

Figure 2:
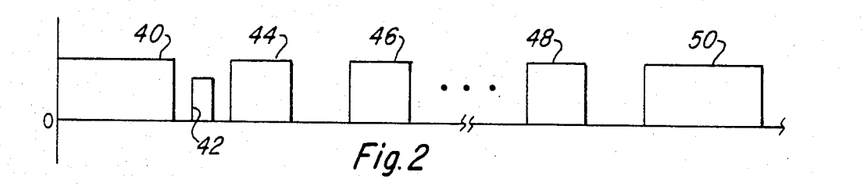
FIG. 2 is a timing diagram of the communications system of FIG. 1.

The power pulses produced by master controller 22 are shown in FIG. 2. The master controller 22 is adapted to receive information from the subcontrollers 29–31 through conductors 26 and 26 between the power pulses. During the power pulses, the subcontrollers 29–31 store energy present in the power pulses to be utilized for operating the sensors, for example, sensors 34, 36 and 37, and their internal circuitry. The power stored within the subcontroller is also utilized to transmit the information onto conductors 25 and 26.

As shown in FIG. 2, a certain predetermined sequence of power pulses is utilized to provide addressing. A power pulse 40 of known duration is produced by master controller 22. Power pulse 40 is of a duration recognized by subcontrollers 29–31 for being an initialization power pulse for providing synchronization information. After pulse 40, the master controller 22 "listens" to conductors 25 and 26 to determine if subcontroller 29 is transmitting information derived from sensor 34. Following pulse 40 subcontroller 29 determines if sensor 34 is actuated and therefore if it has information to transmit to master controller 22. If sensor 34 is actuated, the subcontroller 29 produces an information pulse 42. Pulse 42 is interpreted by master controller 22 as an indication that sensor 34 is actuated. During the interval between power pulse 40 and the next power pulse 44, the other subcontrollers (only subcontrollers 30 and 31 are shown in FIG. 1) do not transmit any information. Following power pulse 44 only subcontroller 30 transmits its information, if any, to master controller 22. Although a digital pulse 42 is shown in FIG. 2, the information transmitted between the power pulses can be in the form of an analog signal. Master controller 22 then produces a power pulse 46 and continues to produce power pulses with one power pulse providing the necessary addressing information to actuate one of the controllers to transmit. After master controller 22 produces power pulse 48, subcontroller 31 transmits its information to master controller 22 concerning the status of sensors 36 and 37. This can include a combination of digital and analog signals.

Pulses 44–48 have a certain known duration which is different from the known duration of pulse 40. Pulse 50 acts as another synchronization pulse. After all the subcontrollers 29–31 and the other subcontrollers not shown are addressed or when desired, master controller 22 produces a power pulse 50 which provides the necessary synchronization to the subcontrollers 29–31 to indicate that a new cycle of power pulses having the duration of power pulses 44, 46 and 48, is to be produced. After power pulse 50 is produced, subcontroller 29 provides its information concerning the status of sensor 34 and the operation of the system continues as discussed above.

Figure 3:
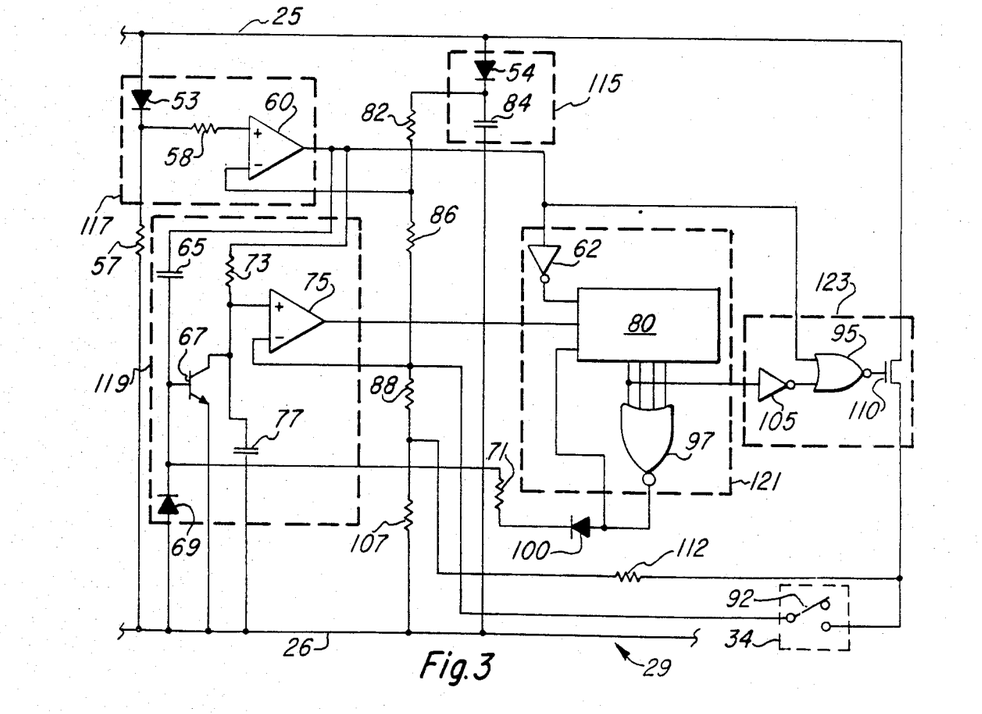
FIG. 3 is a detailed schematic diagram of a subcontroller of FIG. 1.

Subcontrollers 29–31 can be adapted to provide two different output voltage levels. For example, if the master controller is providing power pulses at a voltage level of 9 volts, the subcontrollers 29–31 can transmit a four volt signal if one of the sensors attached thereto is actuated, and a two volt signal if the sensor is not actuated. In this type of system, if the subcontroller responds with a 0 voltage output following the power pulse which addresses the subcontroller, the master controller interprets this as a fault indication. An implementation of subcontroller 29 which is capable of producing two and four volt outputs, depending on the status of sensor 34, is shown in FIG. 3.

The anodes of diodes 53 and 54 are connected to conductor 25. The cathode of diode 53 is connected to one end of resistors 57 and 58. The other end of resistor 57 is connected to conductor 26, and the other end of resistor 58 away from diode 53 is connected to the positive input of a comparator 60. The output of comparator 60 is connected to the input of inverter 62, an input of NOR gate 95, through a capacitor 65 to the base of NPN transistor 67, the cathode of a diode 69, and one end of resistor 73. The collector of transistor 67 is connected to one end of resistor 73, the positive input of a comparator 75, and one side of a capacitor 77. The other side of capacitor 77 is connected to conductor 26. The emitter of transistor 67 is connected to conductor 26. The output of comparator 75 is connected to the reset input of a shift register 80.

The cathode of diode 54 is connected through a resistor 82 to the negative input of comparator 60 and through a capacitor 84 to conductor 26. The negative input of comparator 60 is connected between resistors 82 and 86. The other opposite end of resistor 86 is connected to the negative input of comparator 75 and to one end of a resistor 88 and to a contact of switch 92 within sensor 34. The output of inverter 62 is connected to the clock input of shift register 80. The outputs of shift register 80 are connected individually to a NOR gate 97. The output of NOR gate 97 is connected to the anode of diode 100 and to the data input of shift register 80. The first output of shift register 80 is also connected to the input of an inverter 105. The output of inverter 105 is connected as an input to NOR gate 95. The cathode of diode 100 is connected to one end of resistor 71, which has its other end connected to the base of transistor 67.

The end of resistor 88 away from its connection to the negative input of comparator 75 is connected through a resistor 107 to conductor 26. The output of NOR gate 95 is connected to the gate of FET 110. The source and drain of FET 110 are connected to a contact of switch 92 and to conductor 25. This contact of switch 92 is also connected through a resistor 112 to the end of resistor 107, which is also connected to resistor 88.

The diode 54 and capacitor 84 comprise an internal power source 115. In operation, the capacitor 84 charges during the application of the power pulses by the master controller and maintains a sufficiently high voltage level during the intervals between power pulses to provide power to the other components such as register 80, NOR gate 97, etc. In general, it is desirable to have the various integrated circuits within the subcontroller 29 to be of a low power nature such as the CMOS type to reduce the power requirements of the subcontroller. Diode 53 and comparator 60 comprise a clock extractor 117. The comparator 75, capacitor 77, diode 69, and transistor 67 comprise a synchronization detector 119. Inverter 62, shift register 80, and NOR gate 97 comprise an address decoder 121. The inverter 105, NOR gate 95 and FET 110 comprise a transmitter 123.

In operation, capacitor 84 provides sufficient energy storage to maintain a voltage level approximately equal to that of the power pulses during the short intervals therebetween. The power supplied by capacitor 84 is utilized to operate, for example, comparators 60 and 75 and the other integrated circuits shown in FIG. 3. Further, the voltage potential across capacitor 84 is utilized to provide the necessary biasing voltages within the subcontroller 29.

During the power pulse 40 (FIG. 2), the positive input of comparator 60 is driven positive through resistor 58 to a voltage level higher than the bias voltage set by the voltage divider string of resistors 107, 88, 86 and 82 (junction of resistors 82–86) which causes the output of comparator 60 to go high. This fast rising voltage from comparator 60 is coupled through capacitor 65 to the base of transistor 67. Transistor 67 conducts and discharges any voltage stored on capacitor 77 through the collector of transistor 67. Capacitor 65 charges rapidly through the base of transistor 67 until no further base current flows, which turns transistor 67 off. Now capacitor 77 charges through resistor 73 from the output of comparator 60. If the output of comparator 60 remains at a high level for a sufficient duration, the voltage on the positive terminal of comparator 75 will rise above the bias voltage set by resistor divider string 107, 88, 86, 82 (junction of resistors 86–88), and the output of comparator 75 goes to a high level. This high output causes shift register 80 to reset which provides an output of a low level at all of its four outputs. NOR gate 97 then goes high, which in turn causes transistor 67 to discharge capacitor 77. This pulls the positive input of comparator 75 lower and shuts off its output. The high output of NOR gate 97 is also applied to the data input of shift register 80. The power pulse 40 on conductor 25 also supplies a high signal to the positive input of comparator 60. Therefore, its output is high. This high output is applied as an input to inverter 62 and provides a low level input to the clock input of shift register 80.

When power pulse 40 ends, the output of comparator 60 goes low, which causes the output of inverter 62 to go high. The low to high transition at its clock input causes register 80 to load the high input at its data input and produce a high output to inverter 105. The bit now present in the first location of shift register 80 causes the NOR gate 97 to go low. Thus, only one high data bit is allowed to be loaded into shift register 80. The high output to inverter 105, along with the low output of comparator 60, enables the NOR gate 95 to go high. The high output of NOR gate is applied as an input to the gate of FET 110. This applies the voltage present between resistors 88 and 86 if switch 92 is closed or the voltage level between resistors 88 and 107 if switch 92 is open to conductor 25. The master controller 22 (FIG. 1) examines the voltage levels on conductors 25 and 26 during the interval between pulses 40 and 44 (FIG. 2) to determine whether or not switch 92 is closed.

Pulse 44 is of a shorter duration which does not provide capacitor 77 sufficient time to charge to a high enough voltage level to cause the output of comparator 75 to go high and reset shift register 80. After pulse 44, the output of comparator 60 goes low, which moves the data bits one position within shift register 80. Within subcontroller 30, the inverter corresponding to inverter 105 would be tied to the output which corresponds to the second bit of the shift register 80 and thus its NOR gate is enabled to provide the necessary connection between its FET and the sensor after pulse 44.

During pulse 44, the output of comparator 60 applied through capacitor 65 to transistor 67 causes capacitor 77 to discharge. This starts another synchronization timing interval. If the pulse is of sufficient duration, for example, pulse 40, capacitor 77 will again charge to a sufficient voltage level to turn on comparator 75. Capacitor 65 temporarily supplies sufficient voltage to the base of transistor 67 to cause transistor 67 to turn on to discharge capacitor 77. The transistor 67 then turns off, and capacitor 77 can begin to charge.

Figure 4:
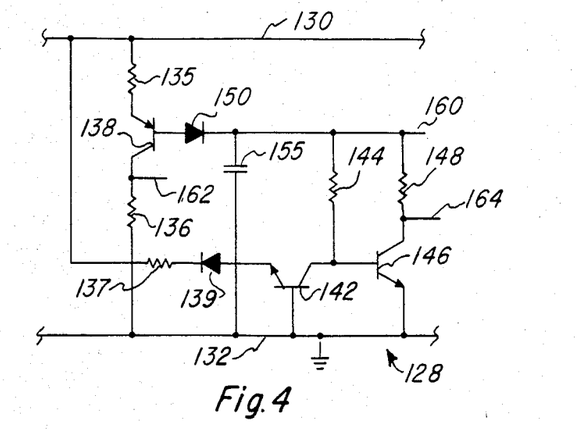
FIG. 4 shows a modification of the subcontroller of FIG. 3.

Another type of clock and synchronization extractor which can be utilized within a subcontroller connected to two conductors 130 and 132 is shown in FIG. 4. The clock and synchronization detector 128 can be utilized within a subcontroller similar to subcontroller 29 to replace the clock extractor 117 and the synchronization detector 119 (FIG. 3). The subcontroller would have to be modified, and conductors 130 and 132 represent conductors similar to conductors 25 and 26 (FIG. 3).

Resistors 135 and 137 are connected at one end to conductor 130 and at their other opposite ends to the emitter of PNP transistor 138 and the cathode of diode 139, respectively. A resistor 136 is connected between the collector of transistor 138 and conductor 132. The anode of diode 139 is connected to the emitter of NPN transistor 142. The base of transistor 142 is connected to conductor 132 which is held at ground by the master controller. The collector of transistor 142 is connected to one end of resistor 144 and to the base of NPN transistor 146. The emitter of transistor 146 is connected to conductor 132 and the collector of trnasistor 146 is connected to one end of resistor 148.

The base of transistor 138 is connected to the anode of diode 150. The cathode of diode 150 is connected to one side of a capacitor 155 and to the ends of resistors 144 and 148 opposite to the ends connected to transistor 146. The side of capacitor 155 away from its connection to diode 150 is connected to conductor 132.

Figure 5:
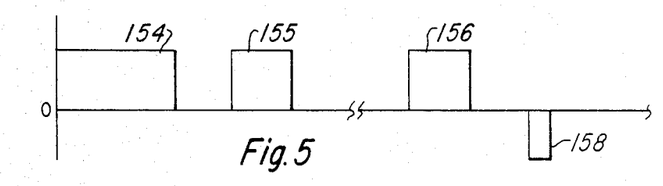
FIG. 5 is a timing diagram of the subcontroller shown in FIGS. 3 and 4.

As shown in FIG. 5, the master controller produces power pulses, for example, power pulses 154, 155, and 156. The master controller is also capable of producing a synchronization pulse 158. Synchronization pulse 158 is a negative voltage which is applied to conductor 130 relative to conductor 132. When a power pulse occurs, for example, power pulse 155, transistor 138 conducts and energy is supplied to capacitor 155 and the circuitry of the subcontroller which is tied to line 160, which would include all of the integrated circuits.

While trnsistor 138 is conducting, a high output is provided to line 162 which is connected between resistor 136 and the collector of transistor 138. This provides the clock signal for the subcontroller. Diode 139 prevents reverse emitter base breakdown of transistor 142 during the positive power pulses 154 through 156. When the synchronization pulse 158 is applied, diode 150 prevents the emitter base breakdown of transistor 138 and prevents the discharge of capacitor 155. When pulse 158 (FIG. 5) occurs, transistor 142 conducts which lowers the voltage present at the base of transistor 146 and transistor 146 turns off. This applies a positive voltage to line 164 which is connected between the collector of transistor 146 and resistor 148. This high output to line 164 is utilized to reset the address counters or addres registers which are utilized in the subcontroller.

Figure 6:
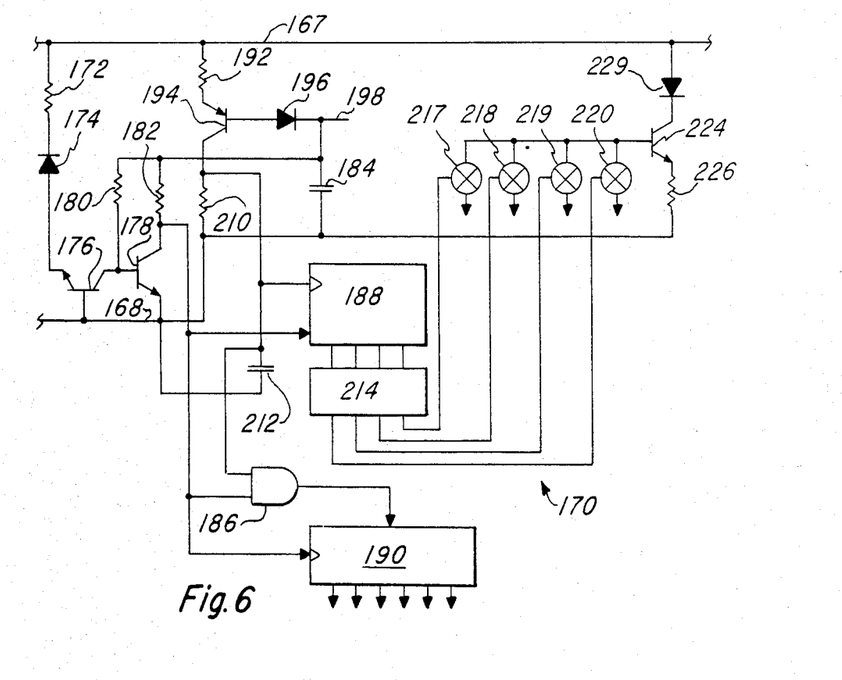
FIG. 6 is a schematic diagram of a subcontroller constructed according to the present invention.

In certain applications, it may be desirable to address specific sensors within the subcontroller or master controller 22 of FIG. 1. Referring to FIG. 6, subcontroller 170 has a resistor 172 connected at one end to conductor 167. The other end of resistor 172 is connected to the cathode of diode 174. The anode of diode 174 is connected to the emitter of NPN transistor 176. The base of transistor 176 is connected to conductor 168. The collector of transistor 176 is connected to the base of an NPN transistor 178 and to one end of resistor 180. The other end of resistor 180 is connected to one end of resistor 182 and one side of a capacitor 184. The other end of resistor 182 is connected to the collector of transistor 178, as an input to AND gate 186, the reset input of a subaddress counter 188, and the clock input of address counter 190. The reset input of counter 190 is connected to the output of AND gate 186. The side of capacitor 184 away from its connection to resistor 180 is connected to conductor 168. Conductor 168 is ordinarily maintained at ground as discussed above in connection with the other subcontrollers.

Capacitor 184 is connected to supply power to the various components, for example, counters 188 and 190, within the subcontroller 170. Resistor 192 has one end connected to conductor 167 and its other opposite end connected to the emitter of PNP transistor 194. The base of transistor 194 is connected to the anode of diode 196. The cathode of diode 196 is connected to the side of capacitor 184 away from its connection to conductor 168. During the power pulses, power is supplied through the limiting resistor 192 and transistor 194 and diode 196 to be stored onto capacitor 184. As discussed above, the power stored on capacitor 184 is supplied through line 198 to various other components within the system. The collector of transistor 194 is connected to one end of a resistor 210, which has its other opposite end connected to conductor 168. The collector of transistor 194 is also connected to the clock input of counter 188, an input of AND gate 186, and one side of a capacitor 212. The side of capacitor 212 away from its connection to the collector of transistor 194 is connected to conductor 168. The outputs of counter 190 are connected as discussed above to decoder circuitry for actuating subcontroller 170 to transmit during the proper interval.

Counter 188 has its output connected through a decoder 214 which actuates one of the switches 217 through 220 in response to the count of counter 188. For example, if the count of counter 188 is at "0001", decoder 214 actuates switch 217 while maintaining switches 218-220 as deactuated. At the next count of "0010", decoder 214 deactuates switch 217 and actuates switch 218. The switches connect various sensors attached therethrough to the base of NPN transistor 224. The emitter of transistor 224 is connected to one end of a resistor 226, which is connected at its other opposite end to conductor 168. The collector of transistor 224 is connected to the cathode of diode 229. The anode of diode 229 is connected to conductor 167. Transistor 224, which is connected at its base thereof to decoder 214 through switches 217-220, provides the appropriate information to conductor 167.

Figure 7:
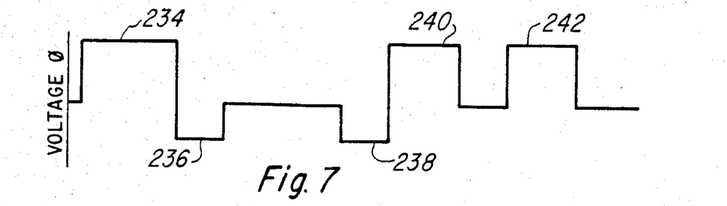
FIG. 7 is a timing diagram of the operation of the subcontroller of FIG. 6.

As shown in FIG. 7, a power pulse 234 is produced by the master subcontroller. The master controller then produces a negative pulse 236 immediately after power pulse 234. The master controller then provides a listening interval at which its output is essentially at ground. The master controller then provides another negative pulse 238, followed by a power pulse 240. Another listening interval occurs which is followed in turn by another power pulse 242.

During the power pulse 234, capacitor 184 is connected through the actuated transistor 194 and is allowed to charge to a predetermined value. When negative pulse 236 occurs, transistor 176 conducts, which brings the base of transistor 178 to essentially ground. Transistor 178 turns off and a high signal is now present at its collector from capacitor 184 through resistor 182. Transistor 194 turns off but capacitor 212 holds its collector at a high level until discharged at a rate determined by resistor 210. The two high signals connected to AND gate 186 reset counter 190. Counter 188 is also reset. However, counter 188 is only reset when, for example, pulse 238 resets counter 188, because, when transistor 194 shuts off or ceases to conduct, the voltage level at the collector of transistor 194 is at essentially ground. Negative pulse 238 does not reset counter 190 because capacitor 212 is not charged and therefore a positive signal is not applied to the other input of AND gate 186. In other words, if a negative pulse has not been immediately preceded by a power pulse, capacitor 212 has discharged and therefore the output of AND gate 186 does not go high during the negative pulse. Power pulse 240 advances counter 188 and continues to do so until another negative pulse is received.

Figures 8, 10:
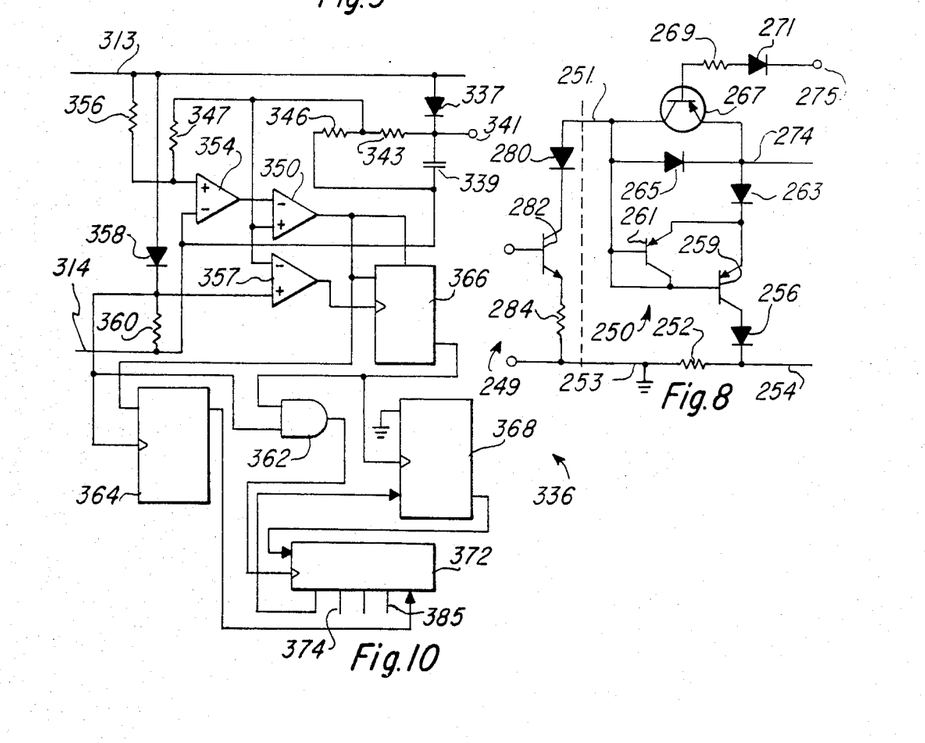
FIG. 8 is a schematic diagram of the output portion of a master controller.
FIG. 10 is a schematic diagram of a decoder utilized in the communication system in FIG. 9.

A master controller 250, which is capable of applying pulses to subcontroller 249, which is similar to the subcontroller 170 of FIG. 6, is shown in FIG. 8 (separated from the subcontroller 249 by a dotted line). Master controller 250 is connected to conductors 251 and 253. Conductor 253 is connected to one end of a resistor 252. The other opposite end of resistor 252 is connected to a line 254 and to the cathode of diode 256. The anode of diode 256 is connected to the collector of PNP transistor 259. Transistor 259 has its base connected to conductor 251 and its emitter to the emitter of transistor 261 and to the cathode of diode 263. The anode of diode 263 is connected to the cathode of diode 265. The anode of diode 265 is connected to conductor 251. The base and collector of transistor 261 are connected to conductor 251. A transistor 267, which is of the PNP type, has its emitter connected to the anode of diode 263, its collector connected to conductor 251, and its base connected to one side of a resistor 269. The other opposite end of resistor 269 away from its connection to transistor 267 is connected to the anode of diode 271. Lines 274 and 275 are connected to the emitter of transistor 267 and to the cathode of diode 271, respectively. Lines 274 and 275 control the output voltages of the master controller 250. Line 254 supplies an output determined by the subcontroller, for example, subcontroller 249 attached to conductors 251 and 253 with conductor 253 held at ground.

Within a subcontroller, for example, subcontroller 249, a diode 280 is connected at its anode to conductor 251. The cathode of diode 280 is attached to the collector of transistor 282. Transistor 282 has its emitter connected through resistor 284 to conductor 253. If analog information is to be transferred, the analog output voltage is applied between the base of transistor 282 and conductor 253.

In operation, master controller 250 supplies either a positive voltage or ground to line 275. Further, the master controller 250 supplies either a positive voltage or a negative voltage to line 274. The voltages can be, for example, a positive voltage level of 10 volts and a negative voltage level of −5 volts. In order to produce a power pulse, a master controller 250 supplies a positive 10 volts to line 274 and ground to line 275. Transistor 267 conducts and supplies a positive voltage which comprises the power pulse to conductor 251. Conductor 253 would be connected through other circuitry (not shown) and held at ground. Therefore, the power pulse is applied from the collector of transistor 267 to conductor 251. Transistors 261 and 259 are essentially shorted and a voltage drop is not present across resistor 252. During a negative pulse, diode 271 prevents breakdown of the base emitter junction of transistor 267. The master controller 250 applies either 10 volts or ground to line 275. A positive 10 volts is applied by master controller 250 to both lines 274 and 275 for receiving information from subcontrollers.

In the arrangement shown in FIG. 8, transistors 259 and 261 comprise a current mirror for developing a voltage drop across resistor 252, which is proportional to the current through conductors 251 and 253. This current is controlled by transistor 282 which can be connected as discussed above to provide an analog output to the master controller. It should be noted that the master controller 250 is connected to conductor 253 and maintains conductor 253 at ground. The voltage level of the end of resistor 252 away from its connection to conductor 253 is applied through line 254 to the master controller. This allows the master controller to receive the information transmitted by the addressed subcontroller, for example, subcontroller 249, through conductors 251 and 253. Although the storage of the energy in positive pulses is shown herein, the negative pulses discussed above can be rectified within a subcontroller to provide additional power for storage onto the capacitor located therein.

Figure 9:
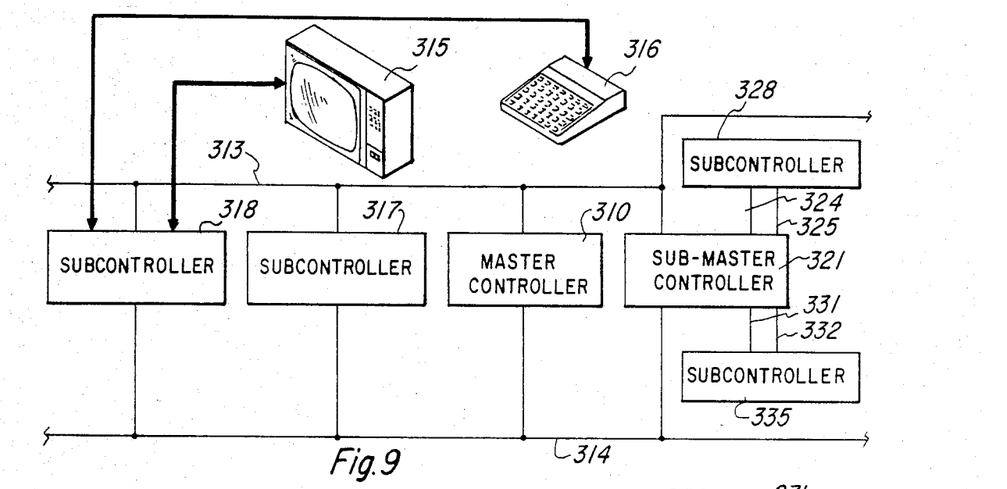
FIG. 9 is a block diagram of a communication system constructed according to the present invention.

As shown in FIG. 9, a master controller 310 is connected to conductors 313 and 314. Conductors 313 and 314 are also connected to subcontrollers 317 and 318 which can be substantially identical to the subcontrollers discussed above. Subcontroller 318 is also connected to a device for displaying information in human readable form such as video monitor 315 and to a device for manually entering information such as keyboard 316. Subcontroller 318 supplies information to monitor 315 for display and receives information from keyboard 316 for responding thereto. The video monitor 315 and keyboard 316 can also be connected to any other subcontroller, master controller, or submaster controller.

Conductors 313 and 314 also have a submaster controller 321 attached thereto. The submaster controller 321 is connected through conductors 324 and 325 to a subcontroller 328. Submaster controller 321 is connected through conductors 331 and 332 to another subcontroller 335. Subcontrollers 317, 318, 328 and 335 are within the system described herebelow individually addressable by master controller 310. In the case of the subcontrollers 328 and 335, they are directly connectable through submaster controller 321 to the master controller 310 through the appropriate conductors as shown in FIG. 9. The master controller 310 is adapted to address subcontrollers 317 and 318 and through submaster controller 321, subcontrollers 328 and 335, and the sensors attached thereto. The master controller 310 by being directly connectable to subcontrollers 317, 318, 328 and 335 can detect errors within the system, for example, false alarms, and also provide the necessary diagnostic testing for display on monitor 315 through subcontroller 318. An instruction decoder 336 which can be utilized with subcontrollers 317, 318, 328 and 335 and submaster controller 321 is shown in FIG. 10.

Instruction decoder 336 is capable of interpreting the pulses issued by master controller 310. The pulses from master controller 310 are comprised of three voltage levels which can be, for example, positive ten volts, ground, and negative ten volts. The anode of diode 337 of decoder 336 is connected to conductor 313. The cathode of diode 337 is connected to one side of capacitor 339 and to one end of a resistor 343. Capacitor 339 is connected at its side away from diode 337 to conductor 314. The end of resistor 343 away from its attachment to diode 337 is connected to one end of resistors 346 and 347, to the positive input of comparator 350, and to the negative input of comparator 357. The end of resistor 347 away from its connection to resistor 343 is connected to the positive input of a comparator 354 and to one end of a resistor 356. The other end of resistor 356 is connected to conductor 313. The negative input of comparator 354 is connected to conductor 314. The end of resistor 346 away from its coonnection to resistor 343 is connected to conductor 314. Capacitor 339 provides the necessary energy storage and provides the energy stored therein through line 341 to the other circuits, for example, to comparator 354.

Diode 358 has its anode connected to conductor 313 and its cathode connected to the positive input of comparator 357, one end of a resistor 360, one input of an AND gate 362, and the clock input of a flip flop 364. The output of comparator 354 is connected to the negative input of comparator 350. The output of comparator 350 is connected to the set input of a flip flop 366. The output of comparator 357 is connected to the clock input of flip flop 366. The output of comparator 350 is also connected to the data input of flip flop 366 and to the data input of flip flop 364. The /Q output (the complement of the Q output) of flip flop 366 is connected to the clock input of a flip flop 368 and to the other input of AND gate 362. The output of AND gate 362 is connected to the clock input of a shift register 372. The clear input of shift register 372 is connected to the Q output of flip-flop 364. The data input of shift register 372 is connected to the /Q output of flip flop 368. Comparator 354 is connected to provide a negative output only when the voltage on conductor 313 is significantly below ground, for example, at minus ten volts. The positive clock pulses from the master controller are decoded by comparator 357 which goes high when conductor 313 has a positive voltage, for example, plus ten volts applied by master controller 310 thereto.

In operation, when master controller 310 issues a negative pulse (a +10 volt to −10 volt transition and following an interval a −10 volt to +10 volt transition) to conductors 313 and 314, comparators 354 and 357 go low. Comparator 350 goes high during the negative pulse. This sets flip-flop 366 with its /Q output low. The data input to flip-flop 364 is high and the clock input to flip-flop 364 is low. With the Q output of flip-flop 364 high, shift register 372 is cleared, and the output of AND gate 362 is low. When the output of master controller 310 goes high, comparators 354 and 357 go high and comparator 350 goes low. It should be noted that comparator 350 would transition after comparators 354 and 357 transition because comparator 350 responds to the transition of comparator 354. Therefore, the /Q output of flip-flop 366 remains low because the low to high clock transition from comparator 357 occurred prior to a high output from comparator 350 applied to its data input. Assuming that master controller 310 is issuing a series of instruction pulses (+10 volts to ground transition and following an interval a ground to +10 volt transition), after the initial +10 volt to ground transition, comparator 354 is high and comparators 350 and 357 are low. After the ground to +10 volt transition, comparator 354 remains high and comparator 350 remains low. Comparator 357 goes high which causes the /Q output of flip-flop 366 to go high. With both inputs high, the output of AND gate 362 goes high. Prior to the output of AND gate 362 going high, the Q output of flip-flop 364 goes low. During the next ground to +10 volt transition, a single high bit is loaded into shift register 372, because AND gate 362 goes from low to high and the /Q output of flip-flop 368 is high. The high bit at the first position of shift register 372 causes the /Q output of flip-flop 368 to go low. The single high bit is clocked through shift register 372 by the ground to +10 volt transition of the instruction pulses, causing the output of AND gate 362 to go from low to high. The operation as discussed above then continues. For example, if a local message to the particular subcontroller is involved while the second output of shift register 372 to line 374 is high, another negative pulse then is provided to conductor 313 by the master controller 310 (FIG. 9) which terminates the message. Then the address can be loaded into the subcontroller.

Figure 11:
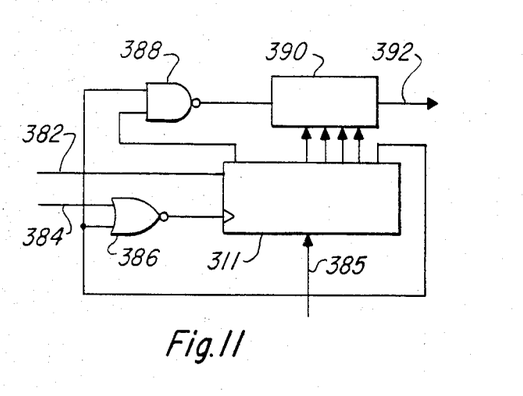
FIG. 11 is a schematic diagram of an address register.

The address register 380 is shown in FIG. 11. Line 382 is connected to the /Q output of flip flop 364. Line 384 (FIG. 11) is connected to the output of comparator 350 (FIG. 10). Line 385 is connected between the clear input to address register 311 and the third output of shift register 372 (FIG. 10). Line 382 is connected to the data input of address register 311. Line 384 is connected to NOR gate 386 as an input thereto. The other input to NOR gate 386 is connected to the last output of address register 311. The output from shift register 311 is also connected as an input to AND gate 388. AND gate 388 is connected to the enable of comparator 390. The output of comparator 390 is connected through line 392 to other circuits of the particular subcontroller wherein it is located in order to provide the necessary indication that this particular subcontroller has been addressed by master controller 310.

In operation, the clocking provided by the Q output of flip flop 364 provides the necessary data input to address register 311 which is clocked in through the output of NOR gate 386. The first bit in each address is a logic one bit which, when loaded into the first output of address register 311 (which is connected to the input of NOR gate 386) prevents any further clock signals from being input to address register 311 until cleared by the signal from line 382. In addition, a logic one bit can be provided as the last bit of the address which is connected to the other input of AND gate 388 which has its output go high when the entire address is loaded into address register 311 which enables comparator 390. The various address bits of the address register 311 are connected as inputs to comparator 390 which then interprets the address to determine whether or not the particular subcontroller wherein it is located is in fact the particular subcontroller addressed.

Figure 12:
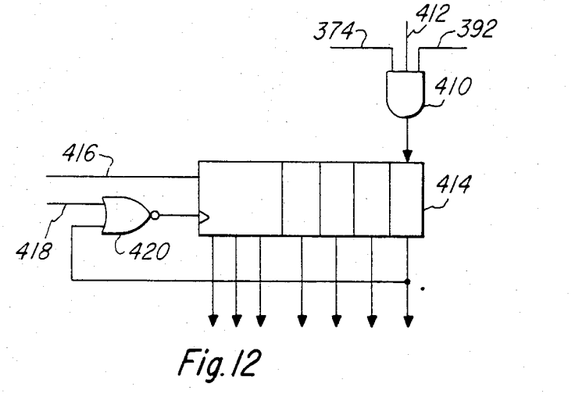
FIG. 12 is a schematic diagram of a flag register.

An example of the enabling function performed by the output of comparator 390 (FIG. 11) through line 392 is shown in FIG. 12. Line 392 is connected as an input to AND gate 410. The Q output of flip flop 366 (FIG. 10) is connected through line 412 to an input of AND gate 410. Another input of AND gate 410 is connected to shift register 372 through line 374. When all the inputs to AND gate 410 are high, the output of AND gate 410 transitions from low to high and causes flag register 414 to reset. The data input of shift register 414 is connected through line 416 to the /Q output of flip flop 364. The output of comparator 354 is connected through line 418 as an input to NOR gate 420. The output of NOR gate 420 is connected to the clock input of flag register 414. As the flag register 414 is loaded, the first input is a logic one followed by the appropriate flags to be set. This initial logical one bit is then shifted through flag register 414 until it reaches the last of the locations which is connected as an input to NOR gate 420. When the output goes high, NOR gate 420 goes low and remains low so that any further clock pulses are not passed through to flag register 414. Flag register 414 provides the necessary logical outputs to the remainder of the circuit within the subcontroller for the execution of the particular desired functional operation of the subcontroller.

Figure 13:
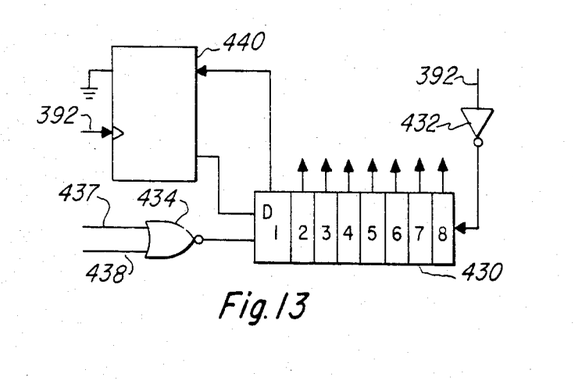
FIG. 13 is a schematic diagram of a sensor addressing device.

The individual addressing of a particular sensor is provided through a shift register 430 as shown in FIG. 13. Shift register 430 receives an enable signal from comparator 390 (FIG. 11) through line 392 as an input to an inverter 432. The output of inverter 432 is connected to the clear input of shift register 430. When comparator 390 determines that the particular subcontroller wherein it is located is addressed, the high output produced is applied through inverter 432 to cause shift register 430 to have all low outputs and to be enabled. A NOR gate 434 has its inputs connected through lines 437 and 438 to the Q output of flip flop 368 (FIG. 10) and the first output (which is also connected to the data input of flip flop 368 of FIG. 10), respectively. NOR gate 434 has its output connected to the clock input of shift register 430. The data input of shift register 430 is connected to the /Q output of a flip flop 440. The clock input of flip flop 440 is connected to line 392 from comparator 390 (FIG. 11). The data input of flip flop 440 is tied to ground. The reset input of flip flop 440 is connected to the first output of shift register 430. This insures that shift register 430 is loaded with only one high logic bit and that this bit is clocked through the shift register 430 as determined by the output of NOR gate 434. Each of the outputs of the shift register are connected to enable one of the sensors to provide its necessary information either in a test mode or actual operation to conductors 313 and 314 (FIG. 9) as discussed above in connection with, for example, the sensor 34 (FIG. 3).

Whereas the present invention has been described in particular relation to the drawings attached hereto, it should be understood that other and further modifications, apart from those shown or suggested herein, may be made within the spirit and scope of the invention.

What is claimed is:

1. A communication system comprising:
   master controller means for providing three different voltage levels including pulses of first and second voltage levels, the pulses of said first voltage level being power pulses;
   subcontroller means including at least one subcontroller adapted to store energy and to selectively transmit information upon being powered by the energy stored thereby;
   first and second conductors extending between said master controller means and said subcontroller means and coupling said subcontroller means to said master controller means, said first and second conductors being normally disposed at the third voltage level;
   said master controller means providing pulses of said first voltage level to supply power along said first and second conductors to be received by said subcontroller means as energy stored therein and providing said second voltage level pulses to address said at least one subcontroller; and
   said at least one subcontroller transmitting information on said first and second conductors to said master controller means in response to receiving said second voltage level pulses therefrom.

2. A communication system as set forth in claim 1, wherein information is transmitted from said at least one subcontroller as an analog signal.

3. A communication system as set forth in claim 1, wherein said master controller means produces transitions from said first voltage level to said second and third voltage levels, from said second voltage level to said first and third voltage levels, and from said third voltage level to said first and second voltage levels.

4. A communication system as set forth in claim 3, wherein certain predetermined sequences of transitions are produced by said master controller means and said at least one subcontroller performs a preselected operation in response to a predetermined sequence of transitions.

5. A communication system as set forth in claim 1, wherein said subcontroller means includes a plurality of subcontrollers, and each of said subcontrollers being effective to store energy from said power pulses and being selectively responsive to a different predetermined sequence between the three voltage levels provided by said master controller means for individually transmitting information via said first and second conductors to said master controller means.

6. A communication system as set forth in claim 5, further including
   a submaster controller coupled to said first and second conductors;
   at least one additional subcontroller operably associated with said submaster controller; and
   conductor means independent of said first and second conductors disposed between said submaster controller and said at least one additional subcontroller and interconnecting said master controller means to said at least one additional subcontroller through said submaster controller.

7. A communication system as set forth in claim 1, further including sensor means operably associated with said at least one subcontroller and being actuated in response to the occurrence of a predetermined condition to which said sensor means is exposed; and
   said at least one subcontroller having signal output means for producing a first signal output in response to actuation of said sensor means and for producing a second signal output if said sensor mens has not been actuated as the information transmitted on said first and second conductors to said master controller means from said at least one subcontroller;
   whereby the reception by said master controller means of said first signal output is indicative of the actuation of said sensor means, the reception of said second signal output is indicative of non-actuation of said sensor means, and the absence of a signal output is indicative of a fault in the system.

8. A method for providing data communication between a master controller and a subcontroller through a pair of conductors coupling said master controller and said subcontroller, comprising the steps of:
   producing transitions between three separate voltage levels in said master controller in certain predetermined sequences to said pair of conductors with at least one voltage level providing power;
   storing energy in said subcontroller when said one voltage level providing power is produced by said master controller and transmitted to said subcontroller via said pair of conductors; and
   selectively transmitting data from said subcontroller to said master controller via said pair of conductors when another voltage level of said three separate voltage levels is produced by said master controller in accordance with a certain predetermined sequence of transitions between said three separate voltage levels by said master controller on said pair of conductors.

9. A communication system comprising:
   a first device for displaying information in human readable form:
   a second device for manually entering information into the system;
   master controller means for providing three different voltage levels including pulses of first and second voltage levels, the pulses of said first voltage level being power pulses, said master controller means being operably associated with said first and second devices for respectively providing information thereto and receiving information therefrom, said master controller means being effective to produce transitions from said first voltage level to said second and third voltage levels, from said second voltage level to said first and third voltage levels and from said third voltage level to said first and second voltage levels in a plurality of different predetermined sequences of transitions;
   subcontroller means including at least one subcontroller for storing energy from said power pulses and selectively transmitting information in response to a particular one of said plurality of predetermined sequence of transitions to said master controller means;
   first and second conductors disposed between said master controller means and said subcontroller means and interconnecting said master controller means to said subcontroller means, said first and second conductors being normally disposed at the third voltage level;

said master controller means providing pulses of said first voltage level to supply power along said first and second conductors to be received by said subcontroller means as energy stored therein;

said at least one subcontroller of said subcontroller means receiving said power pulses from said first and second conductors as provided by said master controller means for storing power from said power pulses and being responsive to receipt of said particular one of said plurality of predetermined sequences of transitions between the three voltage levels as provided by said master controller means via said first and second conductors for transmitting information on said first and second conductors to said master controller means; and said subcontroller means being operably coupled to said first and second devices for providing information to said first device and for receiving information from said second device.

10. A communication system as set forth in claim 9, wherein said first device is a video monitor, and said second device is a keyboard.

11. A communication system as set forth in claim 9, wherein said subcontroller means includes a plurality of subcontrollers, and each of said subcontrollers being effective to store energy from said power pulses and being selectively responsive to a different predetermined sequence of transitions between the three voltage levels provided by said master controller means for individually transmitting information via said first and second conductors to said master controller means.

12. A communication system comprising:
a first device for displaying information in human readable form;
a second device for manually entering information into the system;
master controller means operably associated with said first and second devices for respectively providing information thereto and receiving information therefrom, said master controller means being effective to provide power pulses including a plurality of different predetermined sequences of power pulses;

subcontroller means including a plurality of subcontrollers, each of said subcontrollers being effective to store energy from said power pulses and being selectively responsive to a different predetermined sequence of power pulses unique thereto for transmitting information to said master controller means;

first and second conductors disposed between said master controller means and said plurality of subcontrollers and interconnecting said master controller means to said plurality of subcontrollers;

a submaster controller coupled to said first and second conductors;

at least one additional subcontroller operably associated with said submaster controller;

conductor means independent of said first and second conductors disposed between said submaster controller and said at least one additional subcontroller and inteconnecting said master controller means to said at least one additional subcontroller through said submaster controller;

said master controller means providing power pulses including a particular one of said plurality of predetermined sequences of power pulses to said first and second conductors;

the corresponding one of said plurality of subcontrollers receiving said power pulses from said first and second conductors as provided by said master controller means for storing power from said power pulses and being responsive to receipt of said particular one of said plurality of predetermined sequences of power pulses from said first and second conductors as provided by said master controller means to transmit information on said first and second conductors to said master controller means; and at least one of said subcontrollers being operably coupled to said first and second devices for providing information to said first device and for receiving information from said second device.

* * * * *